United States Patent Office 3,582,306
Patented June 1, 1971

3,582,306
GLASS FEEDERS
James W. Giffen, Corning, N.Y., assignor to Corning
Glass Works, Corning, N.Y.
Filed Nov. 4, 1968, Ser. No. 773,173
Int. Cl. C03b 17/00
U.S. Cl. 65—121                11 Claims

ABSTRACT OF THE DISCLOSURE

A feeder construction having a central glass delivery container surrounded by an outer glass delivery chamber which are in communication along a delivery passage at their lower extents, is provided for forming stratified or composite sheets or ribbons of vitreous material within a confined space directly from separate supplies of molten glass.

BACKGROUND OF THE INVENTION

The formation of multiple-layer sheet glass has been known in the prior art. Danner Pat. No. 1,734,965 discloses method and apparatus for forming composite sheet glass by flowing separate sources downwardly along forming members and then uniting the films formed on each member into a composite sheet. It was not only difficult to maintain uniform thicknesses across the films with this method, but also the surfaces of both the core glass and outer film glass were exposed to atmosphere before they were united, thus detrimentally affecting the resulting bond between adjacent layers of glass.

In a like manner, the De Lajarte Pat. No. 3,218,143 discloses an updraw process for the manufacture of laminated flat glass. However, here again it is difficult to control the thickness uniformity of the applied glass layers relative to the interlayer, particularly where it is desired to produce sheet glass with a defined core thickness encased in a relatively thin skin glass.

Various feeders were also known in the prior art for forming composite glass articles, such as fibers, as shown in Stalego Pat. No. 3,192,023. Such feeders, however, did not provide for glass distribution and control which is necessary to form a composite sheet of glass with uniform layers or stratums. In addition the streams did not unite within a confined space removed from atmospheric attack, which is necessary to achieve ultimate strength and durability in the composite sheet.

SUMMARY OF THE INVENTION

The present invention sets forth novel method and apparatus for forming a composite sheet or ribbon of glass directly from plural sources of molten vitreous material, while in a confined space, and prior to atmospheric exposure.

Basically the invention includes a wedge-shaped central container, having strengthening and distributor rods extending therethrough, for feeding core glass to a slot-like discharge passage, and an outer chamber or container surrounding the central container for feeding outer layer of skin glass to the discharge passage. The discharge passage or slot is formed by a pair of metering units which not only communicably unite the lower portions of the central container and outer chamber, but also define the confined width or thickness of the delivery slot, from which the united layers of glass emanate as a composite-sheet.

It thus has been an object of the present invention to provide method and apparatus for overcoming the problems of the prior art devices in forming laminated sheet glass by distributing molten core glass to a confined delivery slot and metering various layers of molten glass thereon while in such confined orifice and prior to exposure to the atmosphere.

DESCRIPTION OF THE PREFERRED EMBODIMENTS

Figure 1:
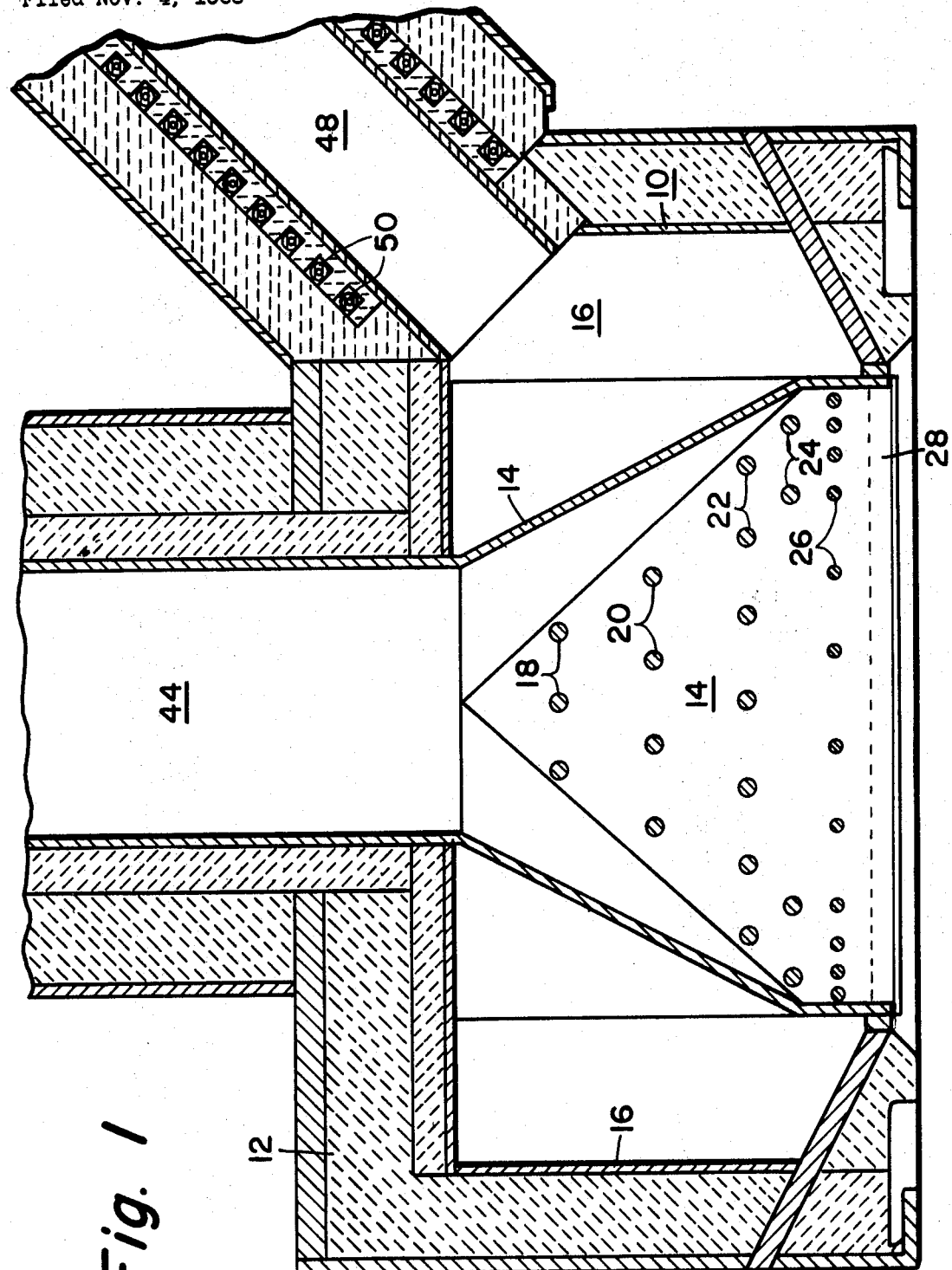
FIG. 1 is a side elevational view in section of a feeder assembly embodying the present invention.

Referring now to the drawings, a feeder assembly 10 is shown encased within a refractory housing 12. The assembly 10 includes a wedge-shaped central container 14 surrounded by an outer chamber or container 16. The central container 14 retains a supply of molten glass which will form the center or core of a laminated sheet, whereas the outer chamber 16 retains molten glass which will serve as an overlay or skin glass for the core glass. A plurality of rows of strengthening and distributor bars 18, 20 and 22 extend through the central container 14 and across the outer chamber 16 to not only add structural stability to the assembly 10, but also provide a degree of impedance to the glass flow so as to more uniformly distribute it for delivery. In addition strengthening and distributor bars or rods 24, 26 extend across the lower portion of central container 14 to both maintain the integrity of the container under the hydraulic head produced by dynamic flow conditions and provide the necessary impedance to flow at the lower end of container 14 so as to distribute the core glass along the delivery passage in such a manner to produce sheet glass of uniform thickness. As will be observed, rods 26 are relatively closely spaced adjacent edge portions of the delivery area in order that sufficient impedance to glass flow is attained in such regions to minimize thickening of the lateral edge portions of sheet formed by the assembly 10.

The lower ends of container 14 and chamber 16 are in communication with one another by means of metering units 28 which physically connect the two containers together, such as by welding. The metering units 28 also form a confined slotted delivery passage 30 wherein the separate glass sources are united in sheet form before being discharged from the assembly. Opposed surfaces 32 of metering units 28 form a delivery slot for the core glass supplied by central container 14. A longitudinally-extending delivery channel 34, opening into delivery passage 30, is formed in each unit 28.

A plurality of metering passages 36, 38 extend through units 28 between the chamber 16 and delivery channel 34. As shown, the passages 38 are longitudinally offset with respect to passages 36 so that the streams of glass entering channels 34 are broken up to prevent patterns or streaks in the sheet issuing from the channels. The size and number of metering passages 36, 38 are chosen to afford maximum impedance to the flow entering the channel 34 and thereby reduce the flow impedance necessitated by the channel walls to control flow rate. Accordingly, this reduces to a minimum the dependence upon a uniform channel opening to maintain a desired rate of glass flow therefrom.

The discharge opening of channel 34 is recessed from surface 32 so as to facilitate the flow of molten glass from chamber 16 in sheet form contiguous with the flow of core glass emanating from between surfaces 32. The lower region of surface 32, over which the glass issues from container 14, and the lower lip of channel 34, over which the glass issues from chamber 16, are both provided with massive long-wearing delivery surfaces. In addition the lower surface 40 of each metering unit 28 is provide with a recess or stepped edge 42 to produce a defined delivery of the glass sheet from the assembly and prevent a wetting thereof by the molten glass.

A vertically projected tubular member 44, having suitable heating elements 46, is utilized to feed molten glass to wedge-shaped container 14, whereas a tubular structure 48 having heating elements 50 is connected to a suitable source of molten glass for supplying glass to outer chamber 16.

The feeder assembly is preferably made of platinum or platinum-rhodium alloy, and is adapted to be electrically heated to maintain molten glass within the separate chambers at suitable fluidities, in a known manner.

Figure 4:
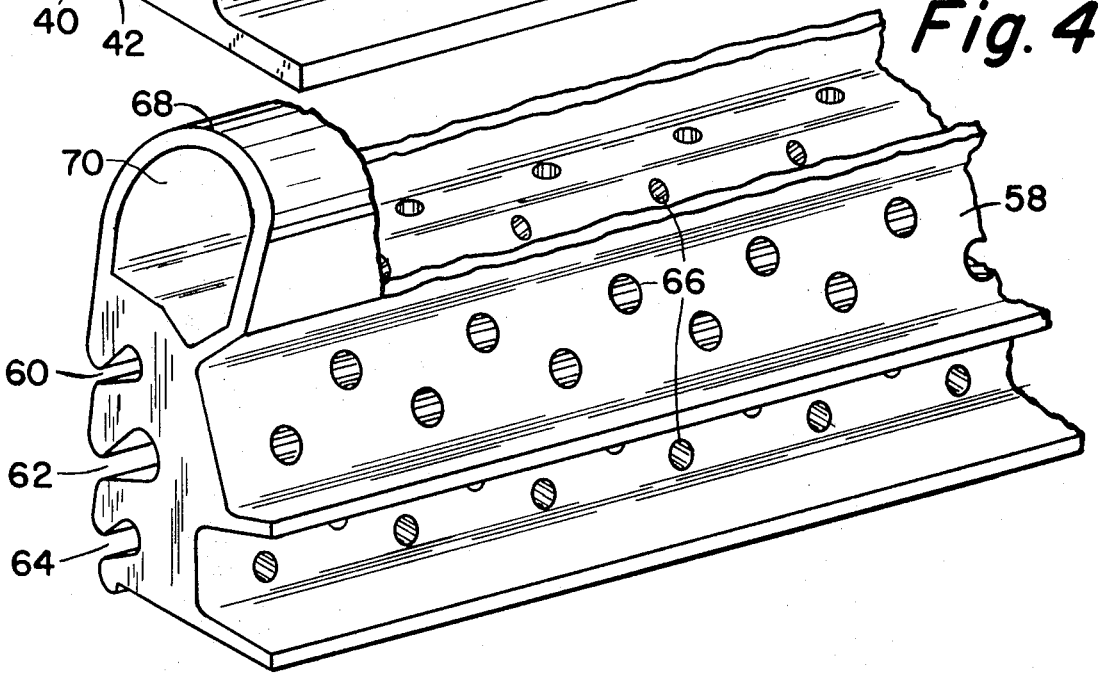
FIG. 4 is an enlarged perspective fragmental view of a modified metering unit.
Figure 5:
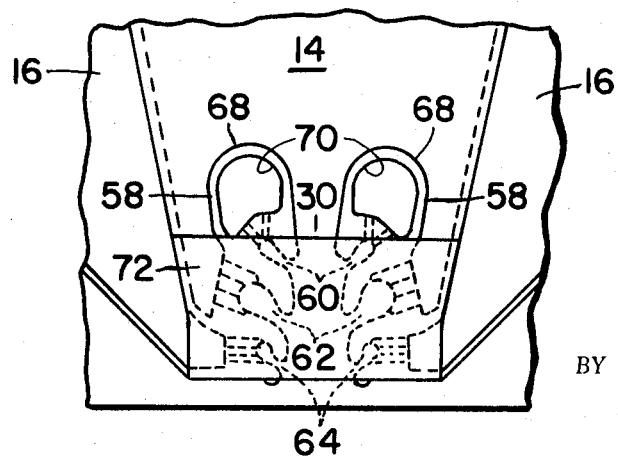
FIG. 5 is a fragmental end elevational view of a feeder incorporating the modified metering unit of FIG. 4.

Referring now to FIGS. 4 and 5, a further embodiment of the invention is disclosed utilizing modified metering units 58. The unit 58 is similar to metering unt 28 except that it is provided with three delivery channels 60, 62 and 64 opening in confined delivery passage 30. Each delivery channel has a plurality of metering passages 66 communicating therewith and a source of glass supply. A housing 68, having open end portions 70 communicating with outer chamber 16 just above the wedge end member 72 of container 14, supplies glass to channel 60.

The sheet produced by the embodiment shown in FIG. 5 is composed of seven layers or stratums. The main core is formed from glass flowing down passage 30 from container 14. Two plies or layers of additional glass are applied to the sheet of core glass from delivery channels 60 which, as previously mentioned, are supplied with glass from chamber 16. Two secondary layers of core glass from container 14 are then applied to the 3 ply composite by channels 62. And finally, additional plies of skin glass from chamber 16 are applied to the 5-ply composite while the composite is still within the confined delivery slot or passage 30, and prior to any of the flows being exposed to atmosphere.

Figure 2:
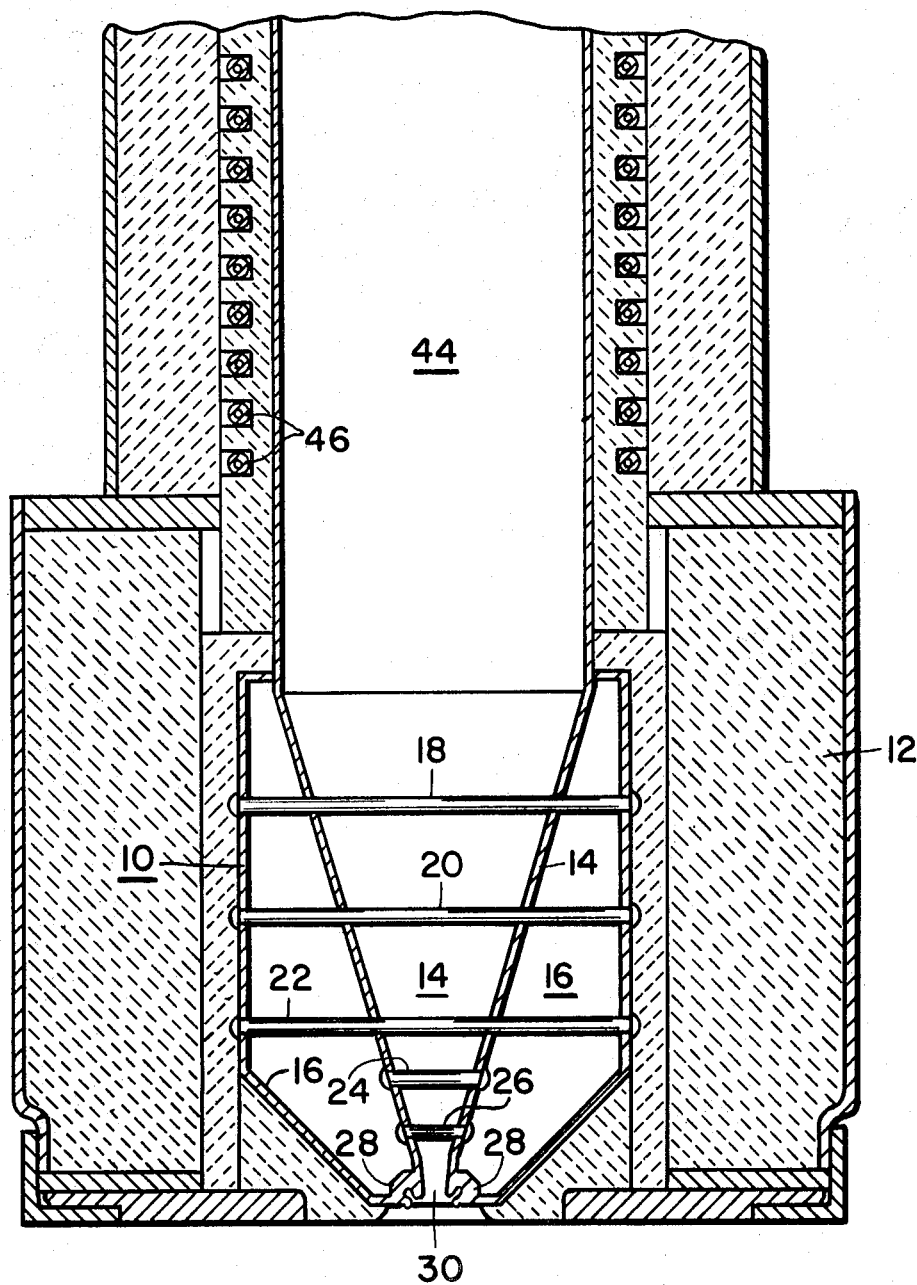
FIG. 2 is an end elevational view in section of the feeder shown in FIG. 1.
Figure 3:
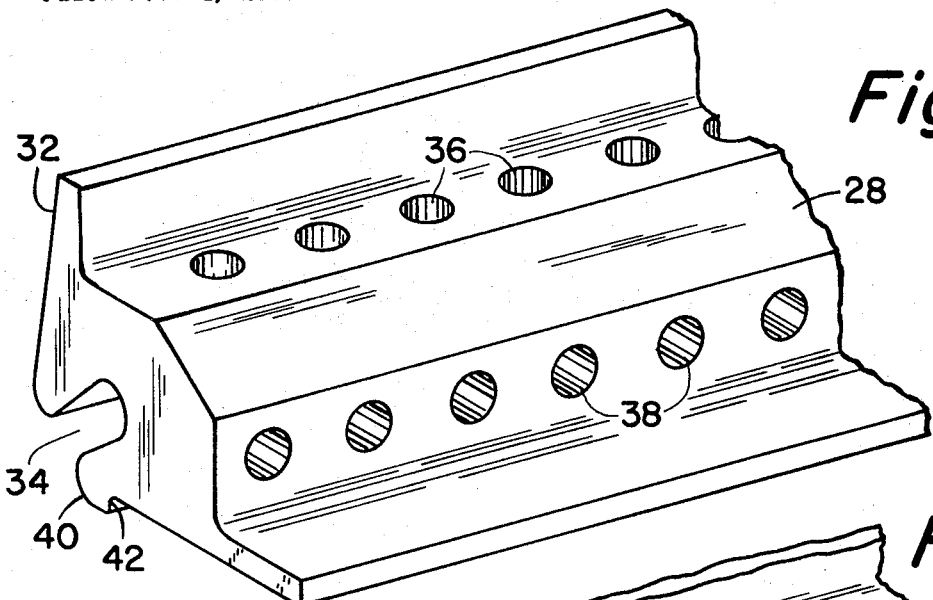
FIG. 3 is an enlarged perspective fragmental view of a metering unit shown in FIGS. 1 and 2.

As an example of the apparatus shown in FIGS. 1–3, molten glass having a viscosity of about 4000 poises was fed to the delivery passage 30 having a width of about ⅜ inch from container 14, and molten glass at a viscosity of about 1000 poises was metered through .09-inch diameter passages 36, 38 of units 28, to unite with the core glass in the confined delivery space prior to being exposed to atmosphere and form a composite sheet. The sheet was rolled and produced a core thickness of .080 inch and skin plies of .004 inch.

Although I have disclosed the now preferred embodiments of the invention, it will be apparent that various changes and modifications may be made thereto without departing from the scope thereof.

I claim:
1. Apparatus for forming multiple ply sheet glass directly from separate sources of molten vitreous material while maintaining such separate sources free from exposure to detrimental gaseous media during the formation of such sheet glass which comprises, container means for retaining a supply of molten core glass, chamber means for retaining a supply of molten skin glass, metering means positioned adjacent lower portions of both said container means and said chamber means, said metering means having a pair of opposed surface portions, said surface portions on said metering means defining a central longitudinal delivery passage along a lower portion of said container means for delivering molten glass from such container means, a longitudinal delivery channel formed in said metering means open along and within said delivery passage adjacent its lower extent, and said longitudinal delivery channel being in communication with the skin glass in said chamber means to form an outer ply of skin glass on the core glass flowing downwardly along said delivery passage before such glass emanates from said delivery passage and prior to being exposed to detrimental gaseous media.

2. Apparatus for forming multiple ply sheet glass as defined in claim 1 wherein said chamber means surrounds said container means, and said metering means includes opposed substantially identical longitudinally-extending metering portions which join lower portions of said container means and chamber means together.

3. Apparatus for forming multiple ply sheet glass as defined in claim 1 wherein strengthening and distributor means extend across portions of said container means for maintaining the structural integrity of the apparatus and for impeding glass flow so as to provide uniform distribution thereof at the delivery passage.

4. Apparatus for forming multiple ply sheet glass as defined in claim 1 wherein said container means is positioned within said chamber means and has downwardly converging wall portions forming a wedge shape terminating at their lower extent in said longitudinal slot-like delivery passage, and a plurality of impedance means connecting lower portions of said converging wall portions adjacent end portions of said longitudinal delivery passage for impeding and thinning the flow of molten glass downwardly along such end regions to provide sheet glass with uniform thicknesses.

5. Apparatus for forming multiple ply sheet glass as defined in claim 1 wherein said container means is surrounded by said chamber means, said metering means includes a pair of substantially identical opposed longitudinally-extending metering portions which connect lower end portions of said container means and chamber means together, and each metering portion has a plurality of metering passage means communicating between the longitudinal delivery channel of each such metering portion and said chamber means for imparting a desired impedance to the flow of the molten glass from said chamber means into said delivery channel.

6. Apparatus for forming multiple ply sheet glass as defined in claim 5 wherein said metering passage means includes a plurality of longitudinally offset rows of holes communicating between said delivery channel and said chamber means so as to inhibit the formation of streaks and patterns on the sheet delivered by the delivery channel.

7. Apparatus for forming multiple ply sheet glass directly from separate sources of molten vitreous material prior to such material being exposed to the atmosphere which comprises, container means for retaining a supply of molten core glass, chamber means for retaining a supply of molten skin glass, metering means communicating between lower portions of said container means and said chamber means, a central longitudinal delivery passage defined by surface portions on said metering means for delivering glass from said container means, a longitudinal delivery channel formed in said metering means open along said delivery passage and in communication with the skin glass in said chamber means to form an outer ply of skin glass on the core glass before emanating from said delivery passage and being exposed to the atmosphere, said container means being surrounded by said chamber means, said metering means including substantially identical opposed longitudinally-extending metering unit portions which connect lower end portions of said container means and chamber means together, each metering unit portion having metering passage means communicating between the longitudinal delivery channel of each such unit and said chamber means for imparting a desired impedance to the flow of molten glass from said chamber means into said delivery channel, each said metering unit portion being provided with three vertically-offset and longitudinally-extending delivery channels, means for supplying skin glass from said chamber means to an upper and lower of said delivery channels, and means for supplying core glass from said container means to a middle of said delivery channels so as to form a seven-ply composite sheet from said delivery passage.

8. Apparatus for forming multiple ply sheet glass as defined in claim 7 wherein the means for supplying skin glass from said chamber means to said upper and lower channels includes a hollow housing formed on upper portions of each said metering unit portion, and said housing having open end portions in communication with said chamber means.

9. Apparatus for forming multiple ply sheet glass as defined in claim 7 wherein each of said delivery channels has a recessed open portion in communication with said delivery passage so as to supply the various plies of glass to the composite while in the confined space of the delivery passage and before being subjected to atmosphere.

10. A method of forming a stratified ribbon of molten glass from a plurality of sources thereof which comprises, forming a plurality of sheet-like molten glass streams of different thicknesses from such plurality of sources, directing such streams into adjoining relationship along a common path within a confined space, and confining a thicker of such streams between a pair of thinner streams thereof before a resulting stratified ribbon emanates from such confined space and before any stream is subjected to gaseous media.

11. A method of forming multiple ply sheet glass which comprises downwardly flowing molten glass of one composition in sheet form to fill a confined space, distributing the flow of molten glass within such space so as to thin longitudinal edge portions thereof, downwardly flowing molten glass of another composition in sheet form on opposite sides of the first sheet, and uniting the three flows within an enlarged confined space into a multiple ply sheet of glass while maintaining such space completely full of molten glass and prior to exposing any of said flows to detrimental gaseous media.

References Cited

UNITED STATES PATENTS 1,734,964   11/1929   Danner _____ 65—121X

ARTHUR D. KELLOGG, Primary Examiner

U.S. Cl. X.R.

65—53, 98, 145